(12) United States Patent
Andrews et al.

(10) Patent No.: US 10,466,826 B2
(45) Date of Patent: Nov. 5, 2019

(54) SYSTEMS AND METHODS FOR ILLUMINATING A TRACK PAD SYSTEM

(71) Applicant: Joyson Safety Systems Acquisition LLC, Auburn Hills, MI (US)

(72) Inventors: David William Andrews, Ortonville, MI (US); Jason Carl Lisseman, Shelby Township, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 382 days.

(21) Appl. No.: 14/509,598

(22) Filed: Oct. 8, 2014

(65) Prior Publication Data
US 2016/0103541 A1    Apr. 14, 2016

(51) Int. Cl.
*B60K 35/00*    (2006.01)
*B60K 37/06*    (2006.01)
(Continued)

(52) U.S. Cl.
CPC ............ *G06F 3/0414* (2013.01); *B60K 35/00* (2013.01); *B60K 37/00* (2013.01); *B60K 37/06* (2013.01); *G06F 3/016* (2013.01); *G06F 3/03547* (2013.01); *B60K 2370/145* (2019.05); *B60K 2370/34* (2019.05); *B60K 2370/56* (2019.05); *B60K 2370/741* (2019.05); *B60K 2370/782* (2019.05)

(58) Field of Classification Search
CPC .. B60K 35/00; B60K 37/06; B60K 2370/741; B60K 2370/56; B60K 2370/782; B60K 2370/34; B60K 2370/145
See application file for complete search history.

(56) References Cited

U.S. PATENT DOCUMENTS

| 4,484,026 A | 11/1984 | Thornburg |
| 4,540,979 A | 9/1985 | Gerger et al. |

(Continued)

FOREIGN PATENT DOCUMENTS

| CN | 102713805 | 10/2012 |
| EP | 1607850 | 12/2005 |

(Continued)

OTHER PUBLICATIONS

Co-pending U.S. Appl. No. 14/509,560, filed Oct. 8, 2014, and its file history.

(Continued)

*Primary Examiner* — Chanh D Nguyen
*Assistant Examiner* — Karin Kiyabu
(74) *Attorney, Agent, or Firm* — Meunier Carlin & Curfman LLC

(57) ABSTRACT

Various implementations of a track pad system include an array of force sensors disposed between a base surface and a touch interface plate. The touch interface plate passes touch forces incident on an upper surface thereof to one or more of the force sensors in the array. At least one light source is disposed adjacent the touch interface plate such that the light from the light source is directed through the touch interface plate to illuminate at least a portion of the upper surface of the touch interface plate. One or more icons may be disposed adjacent the illuminated portion of the touch interface plate.

24 Claims, 10 Drawing Sheets

(51) Int. Cl.
   *B60K 37/00* (2006.01)
   *G06F 3/041* (2006.01)
   *G06F 3/01* (2006.01)
   *G06F 3/0354* (2013.01)

(56) References Cited

U.S. PATENT DOCUMENTS

| | | | |
|---|---|---|---|
| 4,801,771 A | 1/1989 | Mizuguchi et al. | |
| 4,929,934 A | 5/1990 | Ueda et al. | |
| 5,398,962 A | 3/1995 | Kropp | |
| 5,408,873 A | 4/1995 | Schmidt et al. | |
| 5,423,569 A | 6/1995 | Reighard et al. | |
| 5,453,941 A | 9/1995 | Yoshikawa | |
| 5,463,258 A | 10/1995 | Filion et al. | |
| 5,539,259 A | 7/1996 | Filion et al. | |
| 5,793,297 A | 8/1998 | Takeuchi et al. | |
| 5,855,144 A | 1/1999 | Parada | |
| 5,871,063 A | 2/1999 | Young | |
| 5,914,658 A | 6/1999 | Arakawa | |
| 5,943,044 A | 8/1999 | Martinelli | |
| 5,965,952 A | 10/1999 | Podoloff et al. | |
| 6,333,736 B1 | 12/2001 | Sandbach | |
| 6,378,384 B1 | 4/2002 | Atkinson et al. | |
| 6,429,846 B2 | 8/2002 | Rosenberg et al. | |
| 6,501,463 B1 | 12/2002 | Dahley et al. | |
| 6,636,197 B1 | 10/2003 | Goldenberg et al. | |
| 6,809,462 B2 | 10/2004 | Pelrine et al. | |
| 6,906,700 B1 | 6/2005 | Armstrong | |
| 6,933,920 B2 | 8/2005 | Lacroix et al. | |
| 7,126,583 B1 | 10/2006 | Breed | |
| 7,136,051 B2* | 11/2006 | Hein | H03K 17/962 345/156 |
| 7,258,026 B2 | 8/2007 | Papakostas et al. | |
| 7,649,278 B2 | 1/2010 | Yoshida et al. | |
| 8,052,293 B2 | 11/2011 | Hurwitz | |
| 8,203,454 B2 | 6/2012 | Knight et al. | |
| 8,214,105 B2 | 7/2012 | Daly et al. | |
| 8,222,799 B2 | 7/2012 | Polyakov et al. | |
| 8,237,324 B2 | 8/2012 | Pei et al. | |
| 8,269,731 B2 | 9/2012 | Molne | |
| 8,633,916 B2 | 1/2014 | Bernstein | |
| 8,698,764 B1 | 4/2014 | Karakotsios et al. | |
| 9,244,562 B1 | 1/2016 | Rosenberg | |
| 9,337,832 B2 | 5/2016 | Buttolol | |
| 9,864,507 B2 | 1/2018 | Cheng et al. | |
| 9,898,087 B2* | 2/2018 | Lissennan | B62D 1/04 |
| 10,007,342 B2* | 6/2018 | Lisseman | B62D 1/04 |
| 10,067,567 B2* | 9/2018 | Andrews | G06F 3/016 |
| 2002/0041164 A1 | 4/2002 | Kim | |
| 2002/0054060 A1 | 5/2002 | Schena | |
| 2003/0043014 A1 | 3/2003 | Nakazawa et al. | |
| 2003/0076968 A1 | 4/2003 | Rast | |
| 2003/0083131 A1 | 5/2003 | Armstrong | |
| 2003/0206162 A1 | 11/2003 | Roberts | |
| 2004/0021643 A1 | 2/2004 | Hoshino et al. | |
| 2004/0195031 A1 | 10/2004 | Nagasaka | |
| 2004/0207605 A1 | 10/2004 | MacKey | |
| 2005/0021190 A1 | 1/2005 | Worrell et al. | |
| 2005/0052426 A1 | 3/2005 | Hagermoser et al. | |
| 2005/0063757 A1 | 3/2005 | Sugimura et al. | |
| 2005/0067889 A1 | 3/2005 | Chernoff | |
| 2005/0110769 A1 | 5/2005 | DaCosta et al. | |
| 2005/0156892 A1 | 7/2005 | Grant | |
| 2005/0273218 A1 | 12/2005 | Breed et al. | |
| 2006/0025897 A1 | 2/2006 | Shostak et al. | |
| 2006/0054479 A1 | 3/2006 | Iisaka et al. | |
| 2006/0076855 A1 | 4/2006 | Eriksen et al. | |
| 2006/0109256 A1 | 5/2006 | Grant | |
| 2006/0113880 A1 | 6/2006 | Pei et al. | |
| 2006/0177212 A1 | 8/2006 | Lamborghini et al. | |
| 2006/0248478 A1 | 11/2006 | Liau | |
| 2006/0262103 A1 | 11/2006 | Hu | |
| 2006/0284839 A1 | 12/2006 | Breed | |
| 2007/0062753 A1 | 3/2007 | Yoshida et al. | |
| 2007/0097073 A1 | 5/2007 | Takashima et al. | |
| 2007/0100523 A1 | 5/2007 | Trachte | |
| 2007/0129046 A1 | 6/2007 | Soh et al. | |
| 2007/0287494 A1 | 12/2007 | You et al. | |
| 2008/0012837 A1 | 1/2008 | Marriott et al. | |
| 2008/0062145 A1 | 3/2008 | Shahoian | |
| 2008/0079604 A1 | 4/2008 | Madonna et al. | |
| 2008/0202912 A1 | 8/2008 | Boddie et al. | |
| 2008/0230283 A1 | 9/2008 | Yoon et al. | |
| 2008/0264183 A1 | 10/2008 | Graham et al. | |
| 2008/0289887 A1 | 11/2008 | Flint et al. | |
| 2009/0001855 A1 | 1/2009 | Lipton | |
| 2009/0020343 A1 | 1/2009 | Rothkopf et al. | |
| 2009/0114518 A1* | 5/2009 | Lin | G06F 3/03547 200/600 |
| 2009/0125811 A1 | 5/2009 | Bethurum | |
| 2009/0140994 A1 | 6/2009 | Tanaka et al. | |
| 2009/0140996 A1 | 6/2009 | Takashima et al. | |
| 2009/0151447 A1 | 6/2009 | Jin et al. | |
| 2009/0153340 A1 | 6/2009 | Pinder et al. | |
| 2009/0160529 A1 | 6/2009 | Lamborghini | |
| 2009/0189749 A1 | 7/2009 | Salada | |
| 2009/0228791 A1 | 9/2009 | Kim et al. | |
| 2009/0237374 A1 | 9/2009 | Li et al. | |
| 2009/0241378 A1 | 10/2009 | Ellis | |
| 2010/0001974 A1 | 1/2010 | Su et al. | |
| 2010/0045612 A1 | 2/2010 | Molne | |
| 2010/0053087 A1 | 3/2010 | Dai | |
| 2010/0066512 A1 | 3/2010 | Rank | |
| 2010/0141606 A1 | 6/2010 | Bae | |
| 2010/0168998 A1 | 7/2010 | Matsunaga | |
| 2010/0200375 A1 | 8/2010 | Han et al. | |
| 2010/0226075 A1 | 9/2010 | Jahge | |
| 2010/0236911 A1 | 9/2010 | Kim et al. | |
| 2010/0250066 A1 | 9/2010 | Eckstein et al. | |
| 2010/0250071 A1 | 9/2010 | Pala et al. | |
| 2010/0268426 A1 | 10/2010 | Pathak | |
| 2010/0302177 A1 | 12/2010 | Kim et al. | |
| 2010/0315267 A1 | 12/2010 | Chung et al. | |
| 2010/0321310 A1 | 12/2010 | Kim et al. | |
| 2010/0328112 A1 | 12/2010 | Liu | |
| 2011/0037721 A1 | 2/2011 | Cranfill et al. | |
| 2011/0046788 A1 | 2/2011 | Daly et al. | |
| 2011/0054359 A1 | 3/2011 | Sazonov et al. | |
| 2011/0069021 A1 | 3/2011 | Hill | |
| 2011/0109552 A1 | 5/2011 | Yasutake | |
| 2011/0141052 A1 | 6/2011 | Bernstein et al. | |
| 2011/0148608 A1 | 6/2011 | Grant | |
| 2011/0175844 A1 | 7/2011 | Berggren | |
| 2011/0210926 A1 | 9/2011 | Pasquero et al. | |
| 2011/0216015 A1 | 9/2011 | Edwards | |
| 2011/0227872 A1 | 9/2011 | Huska | |
| 2011/0241850 A1 | 10/2011 | Bosch et al. | |
| 2011/0245992 A1 | 10/2011 | Stahlin et al. | |
| 2011/0248728 A1 | 10/2011 | Maruyama | |
| 2011/0255023 A1* | 10/2011 | Doyle | G02B 6/0055 349/58 |
| 2011/0260983 A1 | 10/2011 | Pertuit et al. | |
| 2011/0267181 A1 | 11/2011 | Kildal | |
| 2011/0279380 A1 | 11/2011 | Weber et al. | |
| 2011/0290038 A1 | 12/2011 | Hoshino et al. | |
| 2012/0013573 A1 | 1/2012 | Liu et al. | |
| 2012/0038468 A1 | 2/2012 | Provancher | |
| 2012/0039494 A1 | 2/2012 | Ellis | |
| 2012/0105367 A1 | 5/2012 | Son et al. | |
| 2012/0120009 A1 | 5/2012 | Lussey et al. | |
| 2012/0126959 A1 | 5/2012 | Zarrabi et al. | |
| 2012/0127115 A1 | 5/2012 | Gannon | |
| 2012/0169663 A1 | 7/2012 | Kim et al. | |
| 2012/0223900 A1 | 9/2012 | Jiyama | |
| 2012/0229424 A1 | 9/2012 | Behles et al. | |
| 2012/0267221 A1* | 10/2012 | Gohng | G06F 3/016 200/61.54 |
| 2012/0267222 A1 | 10/2012 | Gohng et al. | |
| 2012/0296528 A1 | 11/2012 | Wellhoefer et al. | |
| 2012/0299856 A1 | 11/2012 | Hasui | |
| 2013/0016053 A1 | 1/2013 | Jung et al. | |
| 2013/0063380 A1 | 3/2013 | Wang et al. | |
| 2013/0063389 A1 | 3/2013 | Moore | |
| 2013/0093679 A1 | 4/2013 | Dickinson et al. | |

(56) References Cited

U.S. PATENT DOCUMENTS

| | | |
|---|---|---|
| 2013/0096849 A1 | 4/2013 | Campbell et al. |
| 2013/0106691 A1 | 5/2013 | Rank |
| 2013/0113715 A1 | 5/2013 | Grant et al. |
| 2013/0113717 A1 | 5/2013 | Van Eerd et al. |
| 2013/0122857 A1 | 5/2013 | Karaogu et al. |
| 2013/0128587 A1* | 5/2013 | Lisseman ............ H03K 17/9638 362/276 |
| 2013/0141396 A1 | 6/2013 | Lynn et al. |
| 2013/0147284 A1 | 6/2013 | Chun |
| 2013/0154938 A1 | 6/2013 | Arthur et al. |
| 2013/0218488 A1 | 8/2013 | Grandemanage et al. |
| 2013/0222287 A1 | 8/2013 | Bae et al. |
| 2013/0222310 A1 | 8/2013 | Birnbaum et al. |
| 2013/0228023 A1 | 9/2013 | Drasnin et al. |
| 2013/0250213 A1* | 9/2013 | Tomomasa ............ G02B 6/0078 349/65 |
| 2013/0250502 A1 | 9/2013 | Tossavainen |
| 2013/0250613 A1* | 9/2013 | Kamada ............... G02B 6/0018 362/608 |
| 2013/0265273 A1 | 10/2013 | Marsden et al. |
| 2013/0307788 A1 | 11/2013 | Rao et al. |
| 2013/0342337 A1 | 12/2013 | Kiefer et al. |
| 2014/0071060 A1 | 3/2014 | Santos-Gomez |
| 2014/0092025 A1 | 4/2014 | Pala et al. |
| 2014/0114624 A1* | 4/2014 | Buchanan ............... G01W 1/02 703/2 |
| 2014/0191973 A1 | 7/2014 | Zellers |
| 2014/0267076 A1 | 9/2014 | Birnbaum et al. |
| 2014/0267113 A1 | 9/2014 | Lisseman et al. |
| 2014/0267114 A1 | 9/2014 | Lisseman et al. |
| 2014/0347176 A1 | 11/2014 | Modarres et al. |
| 2014/0354568 A1 | 12/2014 | Andrews et al. |
| 2015/0009164 A1 | 1/2015 | Shinozaki et al. |
| 2015/0009168 A1 | 1/2015 | Olien et al. |
| 2015/0046825 A1 | 2/2015 | Li |
| 2015/0097791 A1 | 4/2015 | Lisseman et al. |
| 2015/0097793 A1 | 4/2015 | Lisseman et al. |
| 2015/0097794 A1 | 4/2015 | Lisseman et al. |
| 2015/0097795 A1 | 4/2015 | Lisseman et al. |
| 2015/0097796 A1 | 4/2015 | Lisseman et al. |
| 2015/0116205 A1 | 4/2015 | Westerman et al. |
| 2015/0212571 A1 | 7/2015 | Kitada |
| 2015/0309576 A1 | 10/2015 | Tissot |
| 2016/0109949 A1 | 4/2016 | Park |
| 2016/0216764 A1 | 7/2016 | Morrell |
| 2017/0075424 A1 | 3/2017 | Bernstein |

FOREIGN PATENT DOCUMENTS

| | | |
|---|---|---|
| JP | 58-141835 | 9/1983 |
| JP | 64-66522 | 3/1989 |
| JP | 7-247869 | 9/1995 |
| JP | 2005-175815 | 6/2005 |
| JP | 2006-129893 | 5/2006 |
| JP | 2008-181709 | 8/2008 |
| JP | 2009-008613 | 1/2009 |
| JP | 2009-521006 | 5/2009 |
| JP | 2009-186452 | 8/2009 |
| JP | 2009-244931 | 10/2009 |
| JP | 2010-511916 | 4/2010 |
| JP | 2012176640 | 9/2012 |
| KR | 1020060047110 | 5/2006 |
| KR | 1020100129424 | 12/2010 |
| KR | 1020110042924 | 4/2011 |
| WO | 01/88935 | 11/2001 |
| WO | 2006123616 | 11/2006 |
| WO | 2011008292 | 1/2011 |
| WO | 2011045929 | 4/2011 |
| WO | 2013082293 | 6/2013 |

OTHER PUBLICATIONS

Co-pending U.S. Appl. No. 14/509,493, filed Oct. 8, 2014, and its file history.

Office Action dated Jun. 16, 2016, received in connection with U.S. Appl. No. 14/509,493.

Co-pending U.S. Appl. No. 14/509,462, filed Oct. 8, 2014, and its file history.

Co-pending U.S. Appl. No. 14/509,332, filed Oct. 8, 2014, and its file history.

Office Action dated May 3, 2016, received in connection with U.S. Appl. No. 14/509,332.

Co-pending U.S. Appl. No. 14/509,535, filed Oct. 8, 2014, and its file history.

Office Action dated Feb. 11, 2016, received in connection with U.S. Appl. No. 14/509,535.

Co-pending U.S. Appl. No. 14/291,845, filed May 30, 2014, and its file history.

Office Action dated Feb. 24, 2016, received in connection with U.S. Appl. No. 14/291,845.

Office Action dated Sep. 24, 2015, received in connection with U.S. Appl. No. 14/291,845.

Office Action dated Jun. 14, 2016, received in connection with U.S. Appl. No. 14/509,462.

International Preliminary Report on Patentability and Written Opinion, dated Apr. 12, 2016, received in connection with International Patent Application No. PCT/US2014/059639.

International Preliminary Report on Patentability and Written Opinion, dated Apr. 12, 2016, received in connection with International Patent Application No. PCT/US2014/059652.

International Preliminary Report on Patentability and Written Opinion, dated Apr. 12, 2016, received in connection with International Patent Application No. PCT/US2014/059657.

International Preliminary Report on Patentability and Written Opinion, dated Apr. 12, 2016, received in connection with International Patent Application No. PCT/US2014/059669.

International Preliminary Report on Patentability and Written Opinion, dated Apr. 12, 2016, received in connection with International Patent Application No. PCT/US2014/059673.

International Preliminary Report on Patentability and Written Opinion, dated Dec. 10, 2015, received in connection with International Patent Application No. PCT/US2014/040224.

International Search Report and Written Opinion, dated Sep. 24, 2014, received in connection with International Application No. PCT/US2014/040224.

International Search Report and Written Opinion issued in related International Application No. PCT/US2014/059652 dated Dec. 22, 2014.

International Search Report and Written Opinion issued in related International Application No. PCT/US2014/059673 dated Jan. 9, 2015.

International Search Report and Written Opinion issued in related International Application No. PCT/2014/059669 dated Jan. 23, 2015.

International Search Report and Written Opinion issued in related International Application No. PCT/US2014/059657 dated Feb. 16, 2015.

International Search Report and Written Opinion issued in related International Application No. PCT/US2014/059639 dated Feb. 24, 2015.

Office Action dated Sep. 30, 2015 in U.S. Appl. No. 14/509,493, filed Oct. 8, 2014.

Notice of Allowance issued for U.S. Appl. No. 14/509,535 dated Aug. 3, 2016.

Office Action issued in U.S. Appl. No. 14/509,332, dated Oct. 27, 2016.

Office Action issued in U.S. Appl. No. 14/509,462, dated Dec. 28, 2016.

Office Action issued in U.S. Appl. No. 14/509,493, dated Dec. 28, 2016.

Office Action received in connection with U.S. Appl. No. 2011-075258. (English Translation attached) dated Nov. 4, 2014.

Office Action in U.S. Appl. No. 13/076,226, which issued as U.S. Pat. No. 9,007,190 on Apr. 14, 2015, dated Mar. 11, 2013.

(56) References Cited

OTHER PUBLICATIONS

Office Action in U.S. Appl. No. 13/076,226, which issued as U.S. Pat. No. 9,007,190 on Apr. 14, 2015, dated Feb. 13, 2014.
Office Action in U.S. Appl. No. 13/076,226, which issued as U.S. Pat. No. 9,007,190 on Apr. 14, 2015, dated Sep. 11, 2014.
Office Action issued in U.S. Appl. No, 14/509,560, dated Feb. 10, 2017.
Office Action issued in U.S. Appl. No. 14/291,845, dated Feb. 3, 2017.
Office Action issued in U.S. Appl. No. 13/863,363, dated Nov. 10, 2015.
Office Action issued in U.S. Appl. No. 14/211,475, dated Dec. 17, 2015.
Office Action issued in U.S. Appl. No. 14/211,665, dated Dec. 15, 2015.
International Search Report and Written Opinion for International Patent Application No. PCT/US2013/030417, dated Jun. 21, 2013.
Office Action in U.S. Appl. No. 15/230,786 dated Feb. 7, 2017.
Office Action issued in related U.S. Appl. No. 13/673,463, dated Feb. 18, 2015.
Office Action issued in related U.S. Appl. No. 13/673,463, dated Aug. 20, 2015.
Office Action issued in related U.S. Appl. No. 13/673,463, dated Jan. 21, 2016.
Office Action issued in related U.S. Appl. No. 13/673,463, dated Aug. 24, 2016.
Office Action issued in related U.S. Appl. No. 14/028,798, dated Apr. 21, 2016.
Office Action issued in related U.S. Appl. No. 14/028,798, dated Oct. 8, 2015.
Office Action dated Mar. 11, 2013 in U.S. Appl. No. 13/076,226, which issued as U.S. Pat. No. 9,007,190 on Apr. 14, 2015.
Office Action for U.S. Appl. No. 14/509,332, dated Oct. 27, 2016.
Notice of Allowance for U.S. Appl. No. 14/509,535, dated Aug. 3, 2016.
Office Action for JP Application No. 2014-541319 dated Oct. 18, 2016.
Co-pending U.S. Appl. No. 15/230,786, filed Aug. 8, 2016 and its file history.
Co-Pending U.S. Appl. No. 15/391,013, filed Dec. 27, 2016 and its file history.
Co-Pending U.S. Appl. No. 13/673,463, filed Nov. 9, 2012, and its file history.
Co-Pending U.S. Appl. No. 13/863,363, filed Apr. 15, 2013 and its file history.
Interview Summary dated Mar. 23, 2017 in U.S. Appl. No. 14/509,493.
Non-Final Office Action issued in U.S. Appl. No. 14/509,462, dated Jun. 9, 2017.
Notice of Allowance issued in U.S. Appl. No. 14/291,845, dated Sep. 29, 2016.
Office Action issued in co-pending U.S. Appl. No. 14/509,462, dated Nov. 24, 2017.
Office Action issued in co-pending U.S. Appl. No. 14/509,332, dated Feb. 8, 2018.
Notice of Allowance issued in co-pending U.S. Appl. No. 14/509,462, dated Feb. 22, 2018.
Notice of allowance issued in co-pending U.S. Appl. No. 14/509,560, dated Aug. 10, 2017.
Corrected notice of allowance issued in co-pending U.S. Appl. No. 14/509,560, dated Aug. 22, 2017.
Notice of allowance issued in co-pending U.S. Appl. No. 14/509,493, dated Oct. 10, 2017.
Notice of Allowance issued for U.S. Appl. No. 14/509,332, dated Sep. 7, 2018.
Office Action received in Chinese Application No. 2014800030786, dated Feb. 26, 2018.
Supplemental Notice of Allowance, dated May 29, 2018, in connection with U.S. Appl. No. 14/509,462.
Office Action issued for U.S. Appl. No. 15/867,226, dated Jun. 29, 2018.

\* cited by examiner

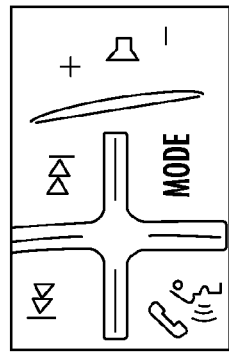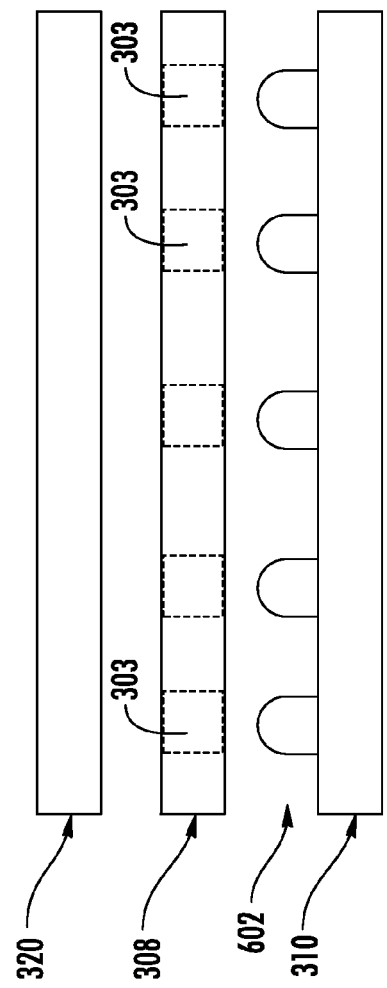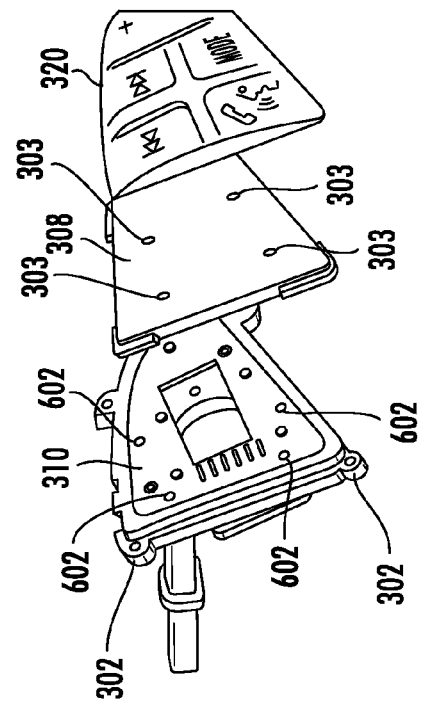

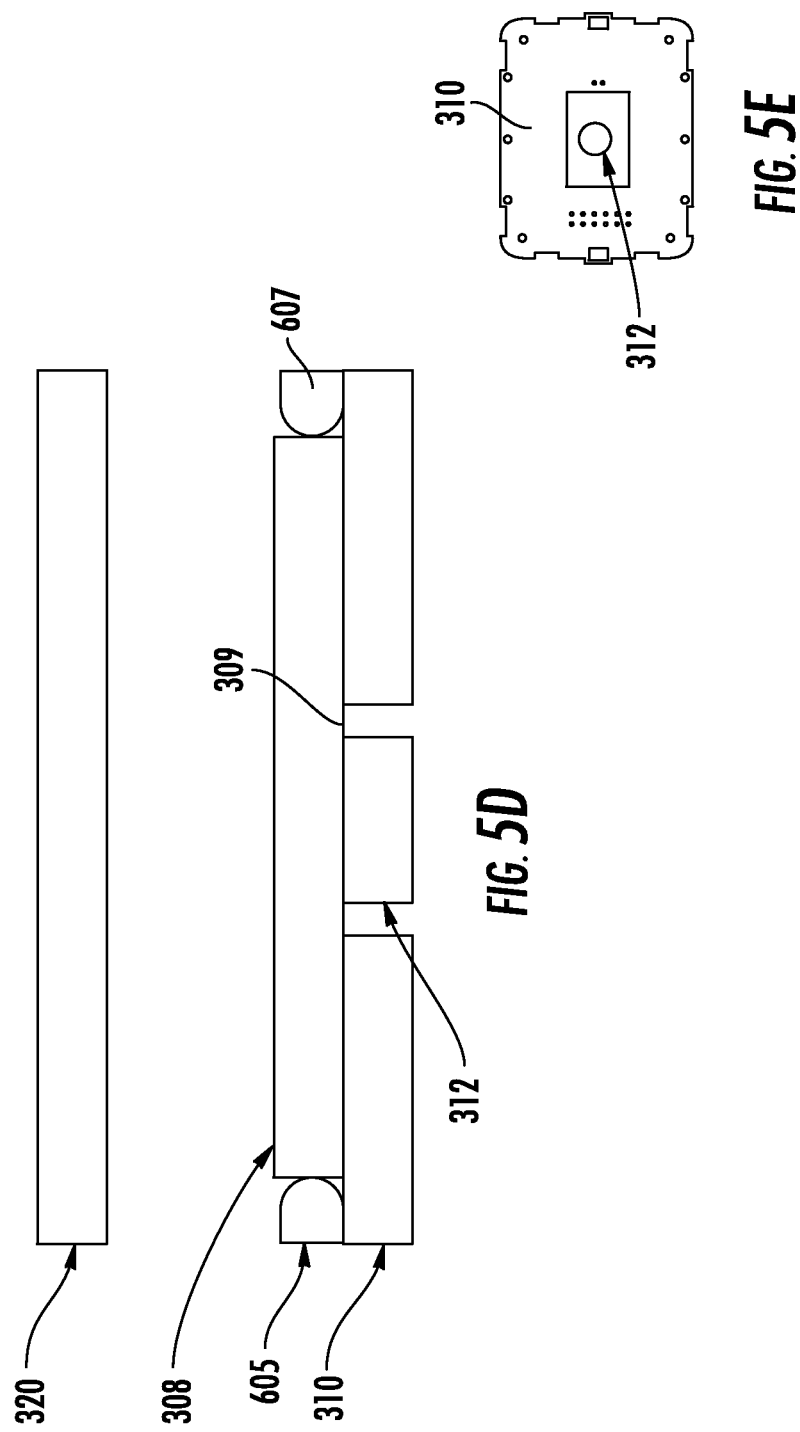

SYSTEMS AND METHODS FOR ILLUMINATING A TRACK PAD SYSTEM

BACKGROUND

Conventional control systems present operators with a combination of controls such as switches, buttons, levers, knobs, dials, etc. The operators interact with these control systems by manipulating the presented controls in order to execute various control functions. Recently, control systems have become increasingly complex due to the growing number of controllable features. As control systems increase in complexity, control panels become cluttered with switches, buttons, levers, knobs and/or dials. Accordingly, the control systems become more difficult to operate. In addition, it becomes difficult for engineers to design control panels that are capable of accommodating all of the necessary controls within a confined space.

Track pad devices have been developed to address the problems in the related art. These devices are generally two-dimensional (X-Y) and include, for example, capacitive and optical sensing systems. For example, some smart phone devices include optical track pads for navigating the graphical user interface (GUI) of the smart phone. The optical track pads have a pleasant tactile feel, provide an audible "tick" for each move and, unlike capacitive touch screens, can be used without direct skin contact or without the need for special gloves. Some optical track pads work with gloves, such as those that include a mechanical contact that is separate from the track pad for accept or select functions. Furthermore, optical track pads generally have a fairly low resolution infrared camera susceptible to moisture (sweat) interferences and are limited to measurements in two (X-Y) dimensions.

SUMMARY

Embodiments of the present invention relate to force based track pads for human-machine interfaces (HMI) and in particular track pads capable of sensing forces as well as position and providing tactile and audible feedback. For example, various implementations of a track pad system include an array of force sensors disposed between a base surface and a touch interface plate. The touch interface plate passes touch forces incident on an upper surface thereof to one or more of the force sensors in the array.

In many HMI systems, illumination is expected as a method to provide the human with a visual marker as to where to activate/deactivate a system. The illumination method typically involves utilizing an LED to direct light through a graphical icon. There are several methods for providing illumination when a touch interface plate is utilized. The first two methods described below involve directing light vertically into the touch interface plate. The third method described below involves directing light horizontally into the touch interface plate. In particular, according to one method, holes in the touch interface plate are provided vertically below the areas where illumination is needed and through which light can shine. A second method includes making the touch interface plate out of a transparent/translucent material and directing light through the lower surface to illuminate the upper surface. And, a third method includes using the touch interface plate as a light guide by directing light through one or more side surfaces of the touch interface plate. With this method, a single light source or multiple light sources are disposed on the same side, adjacent sides, or opposing sides of the touch interface plate such that the light from the light sources is directed through the touch interface plate to illuminate at least a portion of the upper surface of the touch interface plate. In certain implementations, one or more icons may be disposed adjacent the illuminated portion of the touch interface plate.

According to various implementations, a track pad system includes a two-dimensional array of force sensors arranged to have a length and a width and disposed over a base surface, a touch interface plate disposed over the array, and at least one light source. The touch interface plate includes a lower surface disposed facing the array of force sensors and an upper surface opposite the lower surface. The touch interface plate passes touch forces incident on the upper surface through to one or more of the force sensors of the array of force sensors. The light source is disposed adjacent one side of the two dimensional array and is configured for directing light through the touch interface plate to illuminate at least a portion of the upper surface of the touch interface plate. The light may be directed through the lower surface of the touch interface plate and/or through a side surface of the touch interface plate. The side surfaces of the touch interface place extend between the upper and lower surfaces thereof. In another implementation, the light source is a first light source and is disposed adjacent a first side of the two-dimensional array, and the system includes a second light source that is disposed adjacent a second side of the two-dimensional array. The second side may be adjacent to or opposite the first side of the two dimensional array, for example.

The illuminated portion of the touch interface plate may be transparent or translucent, for example. In addition, in some implementations, one or more icons may be disposed adjacent the illuminated portion. For example, the one or more icons may be disposed on an overlay that is disposed adjacent the illuminated portion of the touch interface plate or etched adjacent the illuminated portion of the touch interface plate.

The track pad system may also include one or more light altering films disposed adjacent one of the surfaces of the touch interface plate, according to some implementations. For example, the light altering films may include brightness enhancing films, light diffusing films, or light turning films.

The system may also include a processor in electronic communication with the array of force sensors. The processor is configured for: receiving force information from one or more force sensors; determining from the force information a force position along the width and length and a corresponding force magnitude, the force position identifying the location of the touch force on the upper surface of the touch interface plate; and adjusting an intensity of the light source(s) in response to ambient lighting conditions. The track pad system may also include a feedback generator that generates at least one of a tactile or audible feedback, according to certain implementations. In addition, the base surface may be a printed circuit board that includes the processor. Furthermore, in some implementations, the base surface comprises a reflective material, and the reflective material is configured for directing light from the light source(s) through the illuminated portion of the touch interface plate. In other implementations, an adhesive film having a reflective surface is disposed on the lower surface of the touch interface plate such that the reflective material faces the upper surface of the touch interface plate and is configured for directing light from the light source to the illuminated portion of the touch interface plate.

The light source(s) may include one or more light emitting diodes. In addition, in some implementations, the force sensors include MEMS force sensors, such as structure-based piezo-resistive sensors.

It should be understood that the above-described subject matter may also be implemented as a computer-controlled apparatus (e.g., a human machine interface for a system), a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other and like reference numerals designate corresponding parts throughout the several views:

FIGS. 3A-3C illustrate a force-based track pad illumination system according to one implementation;

FIGS. 5A-5E illustrate force-based track pad illumination systems according to other implementations;

DETAILED DESCRIPTION

Figure 1:
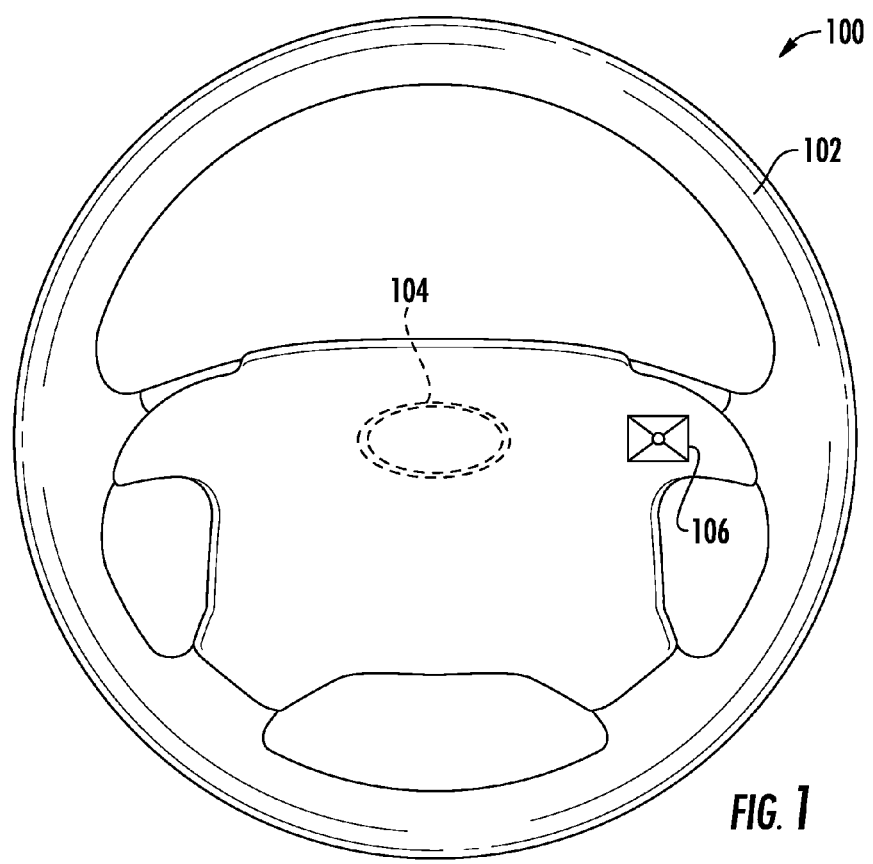
FIG. 1 illustrates a plan view of an exemplary steering apparatus implementing a force-based track pad interface for vehicle control panels in accordance with one implementation.

Described herein are various implementations of a track pad system for recording multi-dimensional data including an X-Y direction and a force magnitude. Various implementations of a track pad system include an array of force sensors disposed between a base surface and a touch interface plate. The touch interface plate passes touch forces incident on an upper surface thereof to one or more of the force sensors in the array. At least one light source is disposed on one side of the array of force sensors such that the light from the light source is directed through the touch interface plate to illuminate at least a portion of the upper surface of the touch interface plate. One or more icons may be disposed adjacent the illuminated portion of the touch interface plate.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a plan view of an exemplary steering apparatus implementing a force-based track pad interface for vehicle control panels in accordance with the present disclosure. An example steering apparatus 100 can have a steering grip 102. A steering grip 102 can be shaped in such a way to facilitate a driver's control of a vehicle when holding the steering grip 102. For example, the steering grip 102 can include an annular ring shape with an outer contour that is essentially circular in shape. In an alternate implementation, the steering grip 102 can define any suitable shape including, for example, circular, elliptical, square, rectangular, or any other regular or irregular shape. In an exemplary implementation, the steering grip 102 can include a single continuous grip portion or any number of unique grip sections. Additionally the steering grip 102 can be mounted on a fixed component 104 such that it can be rotationally moved about a steering axis. An exemplary fixed component 104 can include, for example, a steering column, which receives a steering spindle that extends along the steering column and serves to transmit the rotational movement of the steering grip 102 to the wheels of the motor vehicle. Rotational movement of the steering grip 102 may be transmitted to the wheels by mechanical and/or electrical means. In an exemplary implementation, the steering apparatus 100 can also include a force-based track pad sensor 106, wherein the force-based track pad sensor 106 is operably coupled to the steering grip 102.

Coupling a force-based track pad sensor 106 to the steering grip 102 of a steering apparatus 100 provides a driver with a human-machine interface that can be configured to detect a touch or force provided by a user and determine if a switch function should or should not be activated, for example. In one embodiment, the user can be provided with a tactile or audible feedback response.

A force-based track pad sensor 106 can be any sensor configured to change at least one electrical property in response to a touch or force applied to the sensor 106. A touch, also known as a touch event, can be for example a physical contact that occurs when a driver in a vehicle uses their hand (gloved or ungloved) to apply a force to force-based track pad sensor 106. A force-based track pad sensor 106, can be any suitable tactile sensor including, a mechanical sensor, a resistive sensor, a capacitive sensor, a magnetic sensor, an optical fiber sensor, a piezoelectric sensor, a silicon sensor, and/or a temperature sensor.

The force-based track pad sensor 106 can include a two-dimensional array of force sensors arranged to have a width and a length, where each force sensor includes conductors and electrodes and is in at least partial contact with a touch interface positioned over the array. In one embodiment the track pad sensor 106 can further comprise a base that is in at least partial contact with each of the force sensors. In one aspect, the base can comprise a printed circuit board. The touch interface passes touch forces to one or more force sensors of the array of force sensors. The touch interface can embody any touch-sensitive deformable member that can pass at least part of the forces from a user through the touch interface to one or more force sensors of the array of force sensors. In one embodiment, the touch interface can be used to provide haptic feedback to the user.

Figure 2:
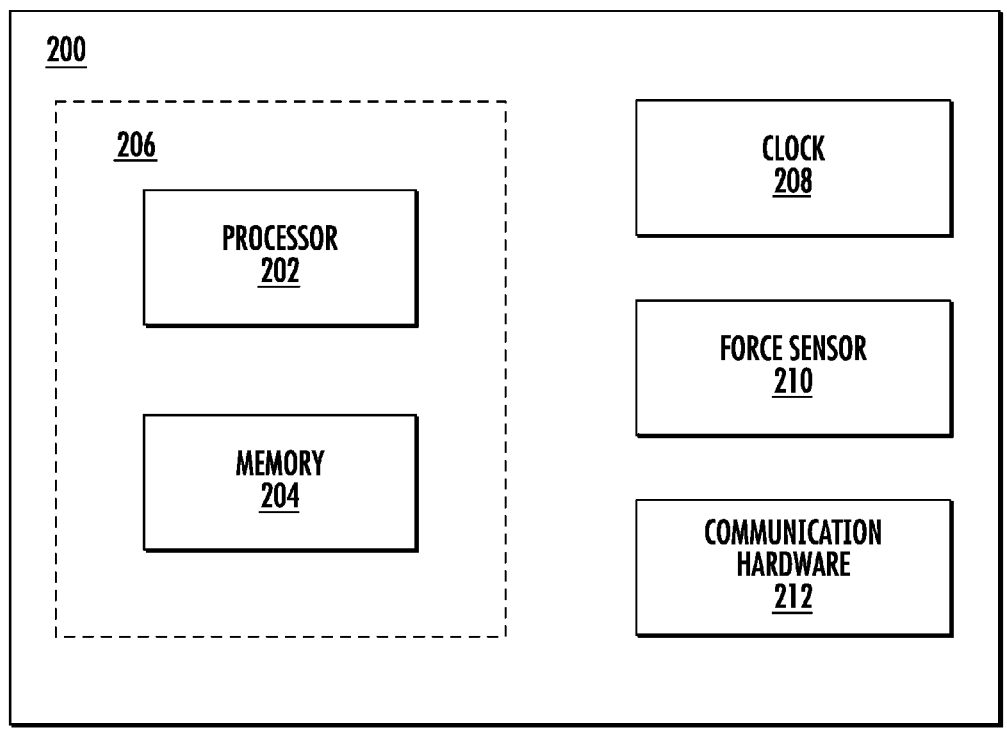
FIG. 2 illustrates a block diagram of a force-based track pad sensor system according to one implementation.

Referring to FIG. 2, a block diagram of a force-based track pad sensor system 200 according to an implementation of the invention is shown. The sensor system 200 is an example of a human machine interface for controlling a system as discussed in further detail below. The sensor system 200 may be used to sense a position and magnitude of force applied to the sensor system 200. In other words, the sensor system 200 may be configured to sense the position of the applied force in either one dimension (e.g., the X- or Y-direction) or two dimensions (e.g., the X- and Y-directions), as well of as the magnitude of the applied force (e.g., force in the Z-direction). The sensor system 200 can also be configured to sense the time that a force is applied at a particular location. The sensor system 200 may include a computing unit 206, a system clock 208, one or more force sensors 210 and communication hardware 212. In its most basic form, the computing unit 206 may include a processor 202 and a system memory 204. The processor 202 may be a standard programmable processor that performs arithmetic and logic operations necessary for operation of the sensor system 200. The processor 202 may be configured to execute program code encoded in tangible, computer-readable media. For example, the processor 202 may execute program code stored in the system memory 204, which may be volatile or non-volatile memory. The system memory 204 is only one example of tangible, computer-readable media. In one aspect, the computing unit 206 can be considered an integrated device such as firmware. Other examples of tangible, computer-readable media include floppy disks, CD-ROMs, DVDs, hard drives, flash memory, or any other machine-readable storage media, wherein when the program code is loaded into and executed by a machine, such as the processor 202, the machine becomes an apparatus for practicing the disclosed subject matter.

In addition, the sensor system 200 may include one or more force sensors 210 that can change at least one electrical property (e.g., resistance) in response to forces applied to the sensor system 200. The force sensor 210 is an example of a pressure sensitive input device as discussed in further detail below. Further, the sensor system 200 may include communication hardware 212 that interfaces with the force sensor 210 and receives/measures the sensed changes in the at least one electrical property of the force sensor 210. Additionally, the sensor system 200 may include a system clock 208. The processor 202 may be configured to associate the sensed changes in the at least one electrical property of the force sensor 210 with a time from the system clock 208 and store the sensed changes and corresponding time to the system memory 204. Optionally, the processor 202 may be configured to analyze the stored data and associate measured changes in the at least one electrical property of the force sensor 210 with various control messages for controlling system functions.

Figure 4B:
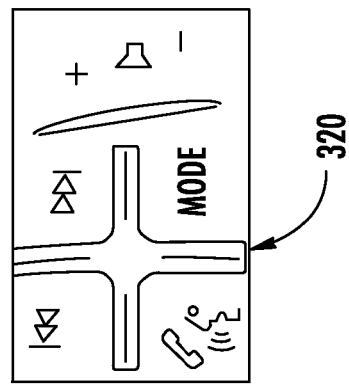
FIGS. 4A-4B illustrate a force-based track pad illumination system according to another implementation.
Figure 4A:
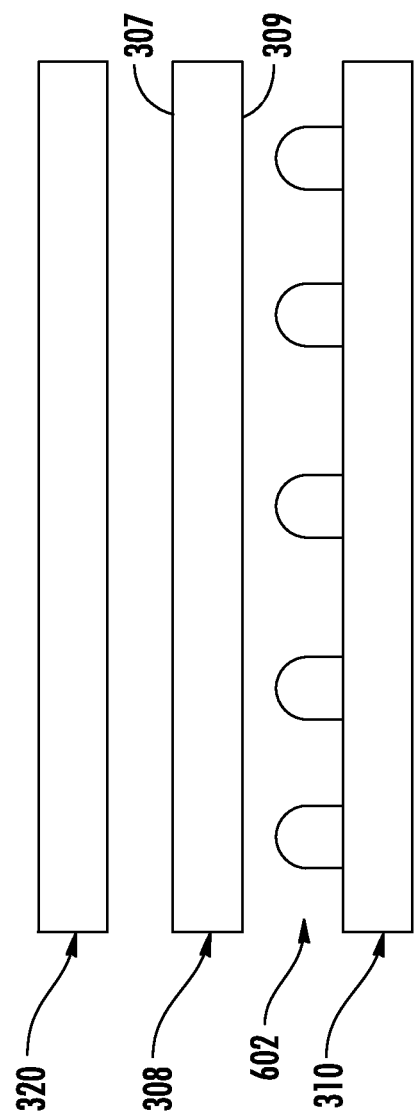

In many HMI systems, illumination is expected as a method to provide the human with a visual marker as to where to activate/deactivate a system. The illumination method typically involves utilizing an LED to direct light through a graphical icon. There are several methods for providing illumination when a touch interface plate is utilized. FIGS. 3A-3C and 4A-4B illustrate two exemplary systems that direct light vertically into the touch interface plate. FIGS. 5A-5E illustrates two other exemplary systems that direct light horizontally into the touch interface plate. In particular, according to the system shown in FIGS. 3A-3C, holes 303 in the touch interface plate 308 are provided vertically below the areas of overlay 320 where illumination is needed and through which light can shine from LEDs 602 disposed below each hole on the base surface 310, which may be a printed circuit board (PCB), below the touch interface plate 308. Overlay 320 with the icons printed or etched thereon is disposed above the touch interface plate 308. FIGS. 4A and 4B illustrate a touch interface plate 308 made out of a transparent/translucent material. Light from LEDs 602 disposed below the touch interface plate 308 on the PCB 310 direct light upwardly through the lower surface 309 of the touch interface plate 308 to illuminate the upper surface 307 of the touch interface plate 308. The light exiting the upper surface 307 of the touch interface plate 308 passes through the icons on the overlay 320 disposed on the upper surface 307 of the touch interface plate 308.

Figure 5B:
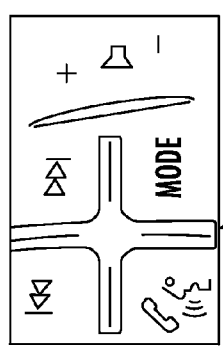
Figure 5C:
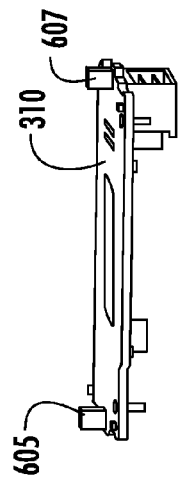
Figure 5A:
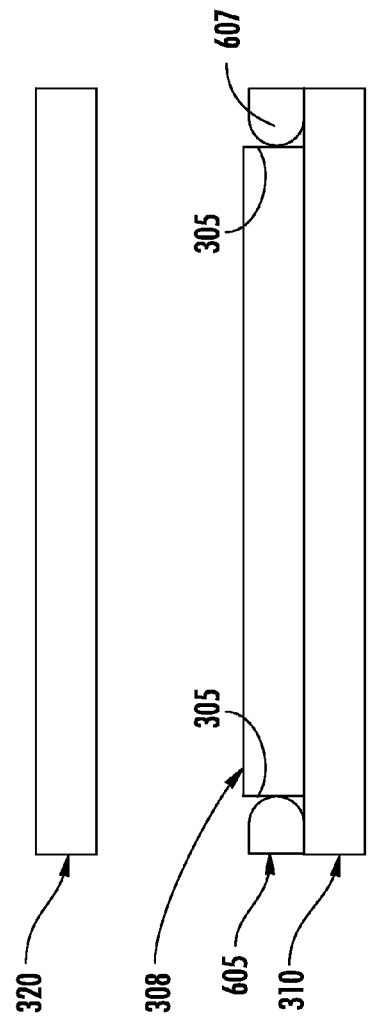

FIGS. 5A-5C illustrate a system 300 in which the touch interface plate 308 is made of a transparent or translucent material and one or more LEDs 605, 607 are disposed on the printed circuit board 310 adjacent a side surface 305 of the touch interface plate 308. In this system, the touch interface plate 308 guides the light from the LEDs 605, 607 horizontally through the touch interface plate 308 and through the upper surface 307 thereof. Icons on the overlay 320 are disposed adjacent the upper surface 307, and light exiting the upper surface 307 passes through the icons to illuminate them. With this system, a single light source or multiple light sources 605, 607 are disposed on the same side, adjacent sides, or opposing sides of the touch interface plate 308, and the light is directed toward the side surface 305 adjacent the light source 605, 607.

FIGS. 5D and 5E illustrate views of an implementation in which the PCB 310 of FIGS. 5A and 5C also includes a feedback generator 312 that abuts the lower surface 309 of the touch interface plate 308. The feedback generator 312, which is discussed in more detail below in relation to FIG. 6C, produces a haptic or audible feedback that is detected by the user that is applying force to the touch interface plate 308.

Figure 6A:
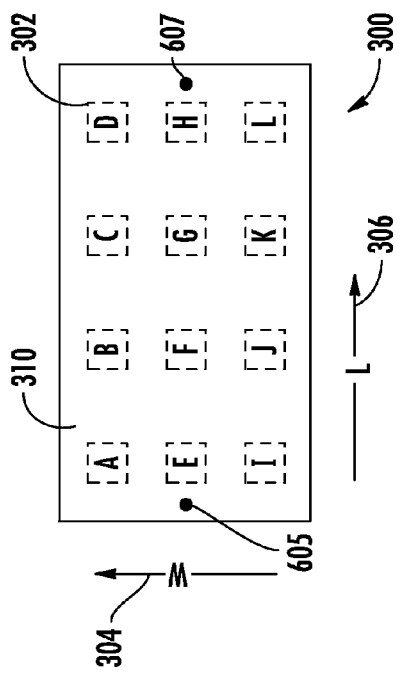
FIGS. 6A and 6B illustrate a cross-sectional view and a plan view of an embodiment of the force-based track pad shown in FIGS. 5A-5C.
Figure 6B:
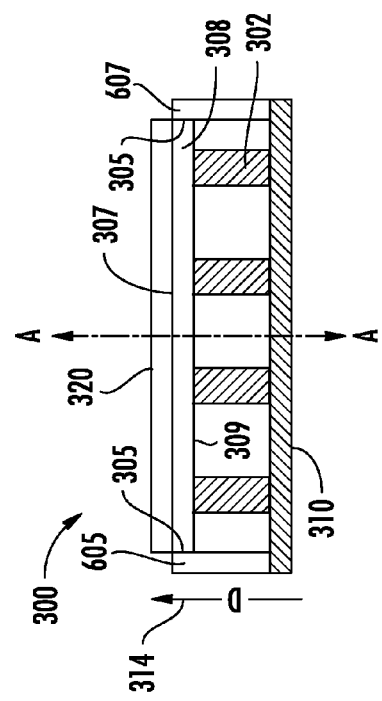

FIGS. 6A and 6B illustrate a cross-sectional view and a plan view of an embodiment of a force-based track pad 300. This embodiment of a force-based track pad 300 includes a two-dimensional array of force sensors 302 arranged to have a geometric shape having a width 304 and a length 306. For example, the array of force sensors 302 may have a width 304 or length 306 that is 8 mm or larger. In another example, the array of force sensors 302 may have a width 304 or length 306 that is less than 8 mm. In one embodiment, the track pad 300 can have a depth 314 that is 0.5 mm or less. In another example, the track pad 300 can have a depth 314 that is greater than 0.5 mm. While the array of force sensors 302 shown in FIGS. 6A and 6B has a rectangular shape, it is to be appreciated that this is for illustrative purposes only and the two-dimensional array of force sensors 302 can have shapes such as circular, oval, square, rectangular, triangular and irregular shapes.

The force-based track pad 300 shown in FIGS. 6A and 6B also includes a touch interface plate 308 positioned over the array of force sensors 302. The touch interface plate 308 includes upper surface 307 and lower surface 309 opposite the upper surface 307. The touch interface plate 308 passes touch forces incident on the upper surface 307 through to one or more force sensors 302 of the array of force sensors 302 disposed adjacent the lower surface 309.

According to various implementations, the touch interface plate 308 can embody any touch-sensitive deformable member that can pass at least part of the forces from a user through the touch interface plate 308 to one or more force sensors 302 of the array of force sensors 302 and allows light to pass through at least a portion of the interface plate 308. For example, the touch interface plate 308 can be comprised of polycarbonate (PC), acrylic, PC-acrylonitrile butadiene styrene (ABS), or other plastic material, glass, rubber, other suitable materials, or combinations thereof. According to certain implementations, the thickness of the material is selected to provide a low mass but provide sufficient thickness to allow light to pass through efficiently and provide sufficient coupling to the light source(s). The material should also be sufficiently stiff to withstand the forces being applied to the upper surface without too much distortion. For example, the thickness of the material for the touch interface plate may be at least about 0.2 mm. In some implementations, the thickness of the touch interface plate may be reduced (e.g., at least about 0.1 mm) when a light altering film is disposed on a surface thereof to assist with directing the light through the material and provide some structural stiffness.

Generally, the force sensors 302 are connected to or integrated with a base surface 310. For example, the base surface 310 may include a printed circuit board (PCB) used to electronically communicate information or power to and from the force sensors 302 in the form of electrical signals. In various embodiments, the base surface 310 can further include electronic circuit components such as resistors, capacitors, diodes, LEDs, transmitters, receivers, and the like. And, in one embodiment, the base surface 310 includes the printed circuit board on which the processor 202 is disposed, thus electrically connecting the force sensors 302 with the processor 202 through the base surface 310.

As noted above in relation to FIGS. 3A-3C, one method of illuminating icons on the touch interface plate includes providing a hole 303 or recessed portion below each icon on the overlay 320 that allows light from individual light emitting diodes (LEDs) 602 disposed directly below each hole 303 to pass through the touch interface plate 308 and icons, illuminating the icons. FIG. 4A also illustrates another method of illuminating icons using LEDs 602 disposed below a transparent or translucent touch interface plate 308. However, these systems have various drawbacks. For example, they require an LED for each icon, which requires more power, and these LEDs are take up additional space on the PCB, which reduces the available space for other electrical components. In addition, the implementation shown in FIG. 3A also requires boring the holes 303 or recessed portions and aligning the icons, holes 303, and LEDs vertically during assembly, which increases production time and costs.

However, various implementations, such as those shown in FIGS. 5A-6D, provide an improved solution that uses less LEDs to illuminate at least a portion of the upper surface 307 of the touch interface plate 308 and any icons that may disposed adjacent to the illuminated portion. This improved solution requires less power, results in faster production with lower production costs, and frees up space on the base surface for other electrical components if needed. In addition, it more readily and inexpensively allows for customization of the touch interface plate 308 for various customers.

In particular, according to certain implementations, such as those shown in FIGS. 5A-6B and 6D, the touch interface plate 308 includes at least one icon disposed thereon that is visible from the upper surface 307 of the touch interface plate 308. The icons may be etched into or printed onto the upper or lower surface of the touch interface plate 308, disposed on overlay 320 that is disposed on the upper or lower surface of the touch interface plate 308, or displayed onto the touch interface plate 308 via an active matrix display, such as is shown in FIG. 6C. The icons disposed on the overlay 320 may be printed thereon prior to being disposed adjacent the touch interface plate 308. In some implementations, the overlay 320 may be a film, an optical characteristic changing film, or an adhesive film, for example, or a substantially rigid material, such as a substantially rigid polymer, that is configured for passing touch forces incident on the overlay to the touch interface plate 308, which transfers the forces to the array of force sensors 302. And, in another implementation, the icons may be micro-machined onto the upper or lower surface of the touch interface plate 308.

Figure 6C:
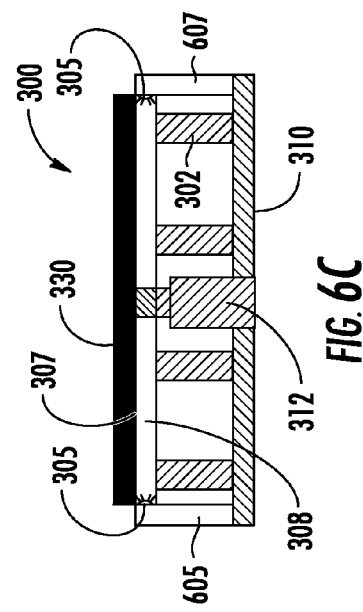
FIG. 6C illustrates another embodiment of a force-based track pad that further comprises a feedback generator that generates tactile and/or audible feedback and includes an active matrix display.

Furthermore, in implementations in which the icons are displayed via the active matrix display, such as in FIG. 6C, active matrix display 330, which may include a graphic screen, such as, for example, organic light emitting diodes (OLEDs), thin-film-transistor liquid crystal displays (TFT LCDs), segmented LCDs, and LCDs, may be disposed on the upper surface 307 of the touch interface plate 308. The active matrix display 330 is configured to pass touch forces incident on an upper surface of the display 330 to the touch interface plate 308, which passes the forces to the array of force sensors 302 on the PCB base surface 310. Instead of the icons being a fixed shape illuminated via the touch interface plate acting as a light guide, the icons would be a graphical representation on an active matrix display, and the graphical representations displayed may be changed in response to the input, according to one implementation. For example, a graphical sliding element may be displayed to move to match a swipe gesture (e.g., volume up or down input).

In implementations in which the icons are to be illuminated, at least a portion of the touch interface surface 308 above or below each icon is transparent or translucent to allow light to pass through. However, in implementations in which the icons do not allow light to pass through them, the area around the icons is transparent or translucent to allow light to pass through the plate adjacent the icons such that the icons may be backlit. In another implementation, the colors of the translucent material adjacent the icons and the icons are selected to blend in with the structure on which the track pad system is mounted. In one example in which the track pad system is mounted onto a steering wheel of a vehicle, the translucent material and the icons may be a black or brown color to match the black or brown outer material of the steering wheel. This provides a "black panel" effect when the icons are not being illuminated, which means the icons are not readily visible when not illuminated. This effect avoids distracting the driver unnecessarily.

FIGS. 3B, 4B, and 5B illustrate exemplary icons related to the audio functions that the operator of a vehicle may use. However, the icons displayed adjacent the touch interface plate 308 may be related to other systems, such as, for example, those systems described in relation to FIG. 7.

Figure 6D:
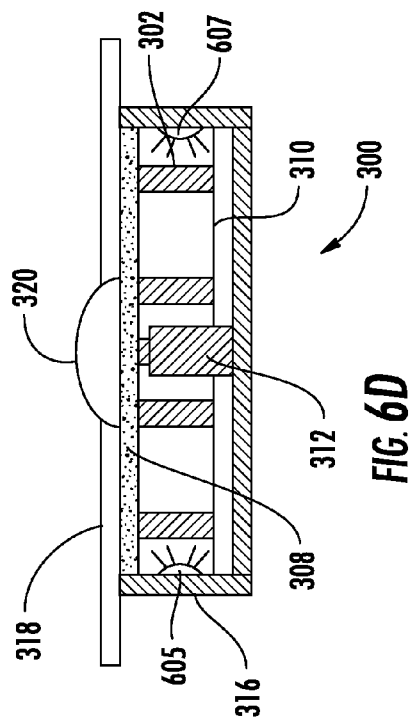
FIG. 6D is an illustration of a cross-sectional view of yet another embodiment of a force-based track pad.

First light source 605 and second light source 607 are disposed adjacent opposite sides of the array 302 and direct light through the touch interface plate 308. For example, the light may be directed toward a side surface 305 of the touch interface plate 308 adjacent each light source 605, 607 and then guided horizontally through the touch interface plate 308 to the upper surface 307. The side surfaces 305 extend between the upper 307 and lower surfaces 309 of the touch interface plate 308. In addition or as an alternative as shown in FIG. 6C, the light may be directed between the base surface 310 and the lower surface 309 of the touch interface plate 308 and guided through the touch interface plate 308 to the upper surface 307 thereof, as shown in FIG. 6D. Furthermore, FIGS. 6A, 6C, and 6D illustrates implementations in which the light sources 605, 607 are disposed opposite each other relative to plane A-A that bisects the touch interface plate 308 and the base surface 310. However, in other implementations (not shown), the light sources 605, 607 may be disposed on sides of the array 302 that are adjacent to, or intersect, each other.

Figure 9:
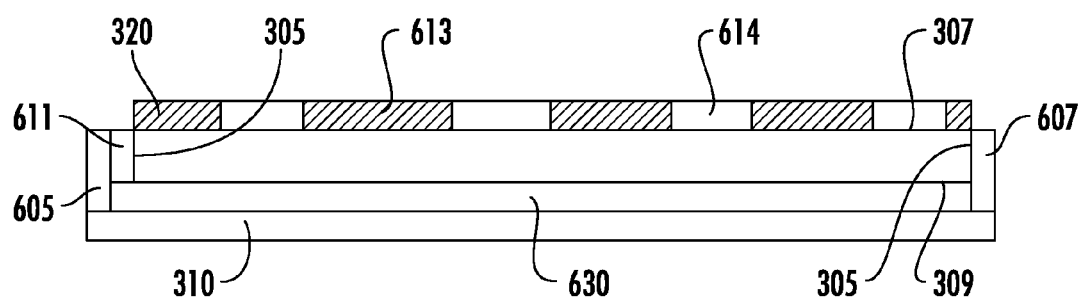
FIG. 9 is a side view of a touch interface plate having layers of film disposed adjacent the side, upper, and lower surfaces of the touch interface plate, according to one implementation.

In addition, in one implementation, at least a portion of the base surface 310 may be coated with a reflective material configured for reflecting light from the light sources toward the lower surface of the touch interface plate 308. For example, the base surface 310 may be a white PCB material (white FR4 material) or coated with a white paint or medium, glass bead ball paint, a reflective polymeric film, or other suitable reflective medium. In other implementations, such as shown in FIG. 9, the reflective material may be provided on an adhesive film 630 that is disposed on the lower surface 309 of the touch interface plate 308 such that the reflective material faces the upper surface 307 so as to direct light entering through the side surfaces 305 toward the upper surface 307.

In the implementations shown in FIGS. 5A, 5D, 5E, 6A, 6C, and 6D, each light source 605, 607 includes a light emitting diode (LED). For example, the LEDs may be top firing LEDs, side firing LEDs, one color LEDs, bi-color LEDs, multi-color LEDs, or infrared LEDs. The LEDs 605, 607 may be used for any number of icons disposed on the touch interface plate 308. The LEDs may receive power from the same power source as the force sensors 302 or from a separate power source. Furthermore, the intensity of the LEDs may be adjusted by the processor 202 based on ambient light conditions in the vehicle, the location of a force incident on the touch interface plate 308, and/or a certain amount of force detected on the touch interface plate 308, for example. For example, the intensity may be higher during the day and lower at night or in lower light conditions in one implementation. In other implementations, the light source may be off during the day and on and set a certain level at night or in lower light conditions. In addition, the light source may be dimmable by the operator. In addition, as shown in FIGS. 5A, 5D, 5E, 6A and 6C, the LEDs are disposed on the base surface 310, and in the implementation shown in FIG. 6D, the LEDs are disposed above the base surface 310, such as, for example, on a side surface of a housing extending around a portion of the track pad system, on legs that extend upwardly from the base surface 310, or on the side surface 305 of the touch interface plate 308.

The amount of power used by the LEDs as compared to previous systems is reduced according to the implementations described above in relation to FIGS. 5A-5E, 6A-6D, and 9. In addition, these implementations do not require multiple LEDs to be disposed on the base surface 310 below the icons on the touch interface plate 308 and the corresponding light guides to be bored into the touch interface plate 308 since the touch interface plate 308 serves as the light guide for the light emitted by the LEDs. Thus, using the touch interface plate 308 as a light guide reduces production time and resources as compared to previous systems. Furthermore, in certain implementations, the icons may be printed or otherwise formed on a film that may be customizable for each customer, allowing for a more streamlined and less costly production of the underlying track pad system.

In certain implementations, the upper surface 307, lower surface 309, and/or side surfaces 305 of the touch interface plate 308 may include one or more light altering films disposed thereon. The light altering films may include, for example, one or more of a brightness enhancing film, a light diffusing film, and/or a light turning film. The light altering film may also block light from passing through it. FIG. 9 illustrates an exemplary layering of films on the touch interface plate 308 according to one implementation. In particular, overlay film 320 comprising the one or more icons is disposed on the upper surface 307 of the touch interface plate 308, and a reflective material film 630 is disposed on the lower surface 309. A light diffusing film 611 is disposed on the side surfaces 305. The light diffusing film 611 diffuses the light from the light sources 605, 607 prior to passing through the touch interface plate 308. The overlay 320 includes a light blocking portion 613 around the icons 614 that prevents the light passing through the touch interface plate 308 from passing through the overlay 320 except through the one or more icons 614. In other implementations, however, the icons may be formed of a light blocking material, and the other portions of the film may be formed of a light transmissive material to allow light to pass through the other portions, which results in a backlighting effect for the icons.

The force sensors 302 are arranged such that the position of a force on the touch interface plate 308 can be detected by one or more of the force sensors 302 of the array of force sensors 302. In this manner, by the force sensors 302 affected by the force on the touch interface 308 and the magnitude of the force on each of the affected force sensors 302, the position (X, Y) of the force on the touch interface plate 308 can be determined. For example, force information from the array of force sensors can be transmitted to a processor such as the processor 202 shown in FIG. 2 and described herein. The processor 202 can be in communication with a memory 204, wherein the processor 202 executes computer-readable instructions stored on the memory 204. The instructions can cause the processor 202 to receive the force information from the array of force sensors 302 and determine a force position along the width 304 and length 306 and a corresponding force magnitude. The force information can be transmitted from the array of force sensors 302 to the processor 202 via a wired connection (including fiber optics, wirelessly (RF using protocols such as Bluetooth™, WiFi (IEEE 802.11n), etc.), or combinations thereof. For example, referring now to FIG. 6B, the processor can receive force information from force sensors c, d, g, and h. By having the location of these force sensors 302 programmed into its memory 204, the processor 202 can determine that a force is being applied to the upper right-hand quadrant of the force-based track pad 300. By determining the magnitude of the force being applied to the force sensors 302, the processor 202 can be programmed via instructions from the memory 204 to further refine the location of the force and to take specific actions based on any of the location of the force on the track pad 300, the magnitude of the force applied to the track pad 300, the time the force is applied to the track pad 300, the change of the location of the applied force to the track pad 300, the rate of the change of the location of the applied force to the track pad 300 (e.g., quickly swiping a thumb across the track pad 300 results in one action being taken while slowly swiping the thumb across the track pad 300 results in a different action being taken), the direction of the change of the location of the applied force to the track pad 300, the length from a first touch point to a second touch point on the track pad 300, the length or distance that a digit is moved across the track pad 300 after a first touch point, the direction that a digit is moved across the track pad 300 after a first touch point, changes in the magnitude of the force applied to the track pad 300, rate of change in the magnitude of the force applied to the track pad 300, combinations of any of the above, and the like.

In various implementations, the processor 202 may be configured for activating/deactivating (or turning on/off) the track pad system 300 in response to receiving a force input over a certain threshold to the track pad system 300. Activation may include turning on the light sources 605, 607 and/or the processor 202 responding to input received after the activation force input. Deactivation may include turning off the light sources 605, 607 and/or the processor 202 ceasing to respond to input received after the deactivation force input. By requiring the force input to meet a certain threshold, the track pad system 300 is not inadvertently activated or deactivated, which could be a distraction to or frustrating for the operator.

As another example, while the system 300 is activated, the processor 202 may be configured for responding to the force input in relation to the force magnitude and/or force duration detected. For example, the volume of an audio system may be increased by first increment in response to a first force magnitude, and the volume may be increased by a second increment in response to a second force magnitude, wherein the second increment is twice as large as the first increment and the second force magnitude is twice as large as the second force magnitude.

Referring back to FIG. 6A, the force sensors 302 can be any device or structure that can transform force into a signal. The signal can be electrical, electronic (digital or analog), mechanical, or optical. For example, in one embodiment the force sensors are microelectromechanical systems (MEMS) sensors. In one embodiment, the MEMS sensors are structure-based piezo-resistive sensors.

FIG. 6C illustrates another embodiment of a force-based track pad 300 that further comprises a feedback generator 312 that generates at least one of a tactile or audible feedback. In one aspect, the tactile or audible feedback provided by the feedback generator 312 is proportional to at least one of the force position and the force magnitude. For example, the tactile or audible feedback can get stronger or louder as greater force is applied to the track pad 300. Similarly, the tactile or audible feedback can get stronger or louder depending upon the location on the track pad 300 where the force is applied. The feedback generator 312 may, in some embodiments, be controlled by the processor 202. For example, the processor 202 may determine the location or magnitude of the force applied to the track pad 300, as described herein, and then cause the feedback generator 312 to generate the tactile or audible feedback that is proportional to at least one of the force position and the force magnitude. Software stored in the memory 204 can cause the processor 202 to perform these functions.

In one embodiment, the feedback generator 312 can be integrated into the structure that comprises the force-based track pad 300. For example, in one embodiment the feedback generator 312 can be integrated into the base 310 and coupled to the touch interface plate 308. In such an implementation, audible and/or tactile feedback may be amplified by the touch interface plate 308. In another embodiment, the feedback generator 312 is a structural part of the structure-based piezo-resistive sensors, as described herein. In yet another embodiment, the feedback generator 312 is a haptic generator used to generate the tactile and audible feedback. In one embodiment, the haptic generator can be a coneless coil and magnet assembly such as that described in U.S. Pat. App. Pub. No. 2012/0039494 entitled "LOUDSPEAKERS" and filed on Feb. 16, 2010, which is fully incorporated herein by reference and made a part hereof.

The embodiments of a force-based track pad 300 described herein can be used to control one or more systems. For example, embodiments of a force-based track pad 300 described herein can be used to control the systems of a vehicle such as environmental (HVAC), audio, telephone, cruise control, windshield wipers, lighting, window and mirrors, and the like. For example, instructions stored in the memory 204 can further cause the processor 202 to send a control message to a system selected from a plurality of systems, wherein the control message is selected from a plurality of control messages by the processor 202. The selection of system and control message can be made depending upon one or more of the force position along the width and length and the corresponding force magnitude. For example, in one embodiment the system can be selected from the plurality of systems depending upon the force magnitude and the control message is selected from the plurality of control messages depending at least partially upon the force position along the width and length.

Consider this example, the force-based track pad 300 can have a plurality of force thresholds that can be used to select the system from the plurality of systems. For example, the force-based track pad 300 can have at least three thresholds that correlate to a different system for each threshold. In one example, the force thresholds are in increments of one Newton (N) or one ounce, two N or two ounces, and the like. For example, the first threshold may be at a force of one Newton (N) or one ounce and correlate to the audio system of a vehicle. The second threshold can be at two N or two ounces of force that correlates to the HVAC system for the vehicle. The third threshold can be at three N or three ounces of force that correlates to the cruise control system for the vehicle. In other words, the track pad 300 can recognize force magnitude of at least three thresholds and the system is selected from the plurality of systems depending upon the force magnitude exceeding one or more of the thresholds.

In one embodiment, once the system is selected from the plurality of systems based on the force magnitude, a control message for sending to that selected system can be selected from a plurality of control messages based at least in part on the force position along the width and length of the track pad 300. For example, if the HVAC system is selected based on the force magnitude, then a control message such as turn on/off the heat, turn up/down the fan, adjust the temperature, etc., can be selected based at least in part on the force position along the width and length of the track pad 300. For example, control messages to send to the selected system can be selected based on one or more of the time the force is applied to the track pad 300 at a certain location, the change of the location of the applied force to the track pad 300, the rate of the change of the location of the applied force to the track pad 300 (e.g., quickly swiping a thumb across the track pad results in one action being taken while slowly swiping the thumb across the track pad 300 results in a different action being taken), the direction of the change of the location of the applied force to the track pad 300, the length from a first touch point to a second touch point on the track pad 300, the length or distance that a digit is moved across the track pad 300 after a first touch point, the direction that a digit is moved across the track pad 300 after a first touch point, changes in the magnitude of the force applied to the track pad 300, changes in the magnitude of the force applied to the track pad 300, rate of change in the magnitude of the force applied to the track pad 300, combinations of any of the above, and the like.

In one embodiment, the feedback generator 312 can provide an audible tick or other sound when the control message is selected from the plurality of control messages depending at least partially upon the force position along the width and length and provide the tactile feedback for each selection made depending on the force magnitude. Alternatively, the feedback generator 312 can provide an audible tick for each selection made depending on the force magnitude and provide tactile feedback when the control message is selected from the plurality of control messages depending at least partially upon the force position along the width and length of the track pad 300.

FIG. 6D is a cross-sectional view of yet another embodiment of a force-based track pad 300. This embodiment includes the two-dimensional array of force sensors 302 arranged to have a geometric shape having a width 304 and a length 306, a touch interface 308 positioned over the array of force sensors 302, wherein the touch interface 308 passes touch forces through to one or more force sensors 302 of the array of force sensors 302, a base 310, and a feedback generator 312 that generates at least one of a tactile or audible feedback. Further comprising the embodiment shown in FIG. 6D is an enclosure 316 that encloses the components of the track pad 300. The enclosure 316 can be comprised of any suitable material such as plastics, metals, and the like. It can be used to add structural integrity to the track pad 300 as well as to protect it from physical and/or environmental damage or contamination. The enclosure 316 may also facilitate manufacturing, installation or removal of the track pad 300. Further illustrated in FIG. 6D is an interchangeable overlay 320 so that different materials, colors, textures can be used for the track pad 300, which can be used for an aesthetic effect of a larger device, such as a vehicle, where the track pad 300 is installed. This can also allow replacement of the overlay 320 if it becomes damaged, dirty or worn. Also shown in FIG. 6D, but not required, is the trim 318 of a larger device, such as a vehicle, where the track pad 300 is installed. For example, the trim 318 can be a part of the steering apparatus 100 shown in FIG. 1.

Figure 7:
FIG. 7 is an illustration of a table that provides examples of systems that can be selected and control messages that can be sent to the selected system by an application of one implementation.

As noted herein, the force-based track pad can be used to select and control a plurality of systems. The table 400 of FIG. 7 illustrates examples of systems that can be selected and control messages that can be sent to the selected system. For example, the force-based track pad 300 can have a plurality of thresholds that correlate to a different system for each threshold. In one example application of an embodiment of the invention, as shown in the table 400 of FIG. 7, the first threshold may correlate with the HVAC system for a vehicle. By selecting the first threshold by applying a defined amount of force (e.g., one N or one ounce) to the track pad 300 (either momentarily or for a defined period of time), the HVAC system can be selected and controlled using the track pad 300. Once selected by the force applied to the track pad 300, the track pad 300 can be used to select and send control messages to the HVAC system. Gestures or other actions using the track pad 300 that are at least partially dependent upon the position along the width and length of the track pad 300 can be used to send the control messages to the HVAC system. For example, control messages to send to the selected system can be selected based on one or more of the time the force is applied to the track pad 300 at a certain location, the change of the location of the applied force to the track pad 300, the rate of the change of the location of the applied force to the track pad 300 (e.g., quickly swiping a thumb across the track pad results in one action being taken while slowly swiping the thumb across the track pad 300 results in a different action being taken), the direction of the change of the location of the applied force to the track pad 300, the length from a first touch point to a second touch point on the track pad 300, the length or distance that a digit is moved across the track pad 300 after a first touch point, the direction that a digit is moved across the track pad 300 after a first touch point, changes in the magnitude of the force applied to the track pad 300, changes in the magnitude of the force applied to the track pad 300, rate of change in the magnitude of the force applied to the track pad 300, combinations of any of the above, and the like. For the exemplary HVAC system that has been selected, such control messages can include for example: Turn on/off; Adjust temperature; Adjust fan speed; Adjust mode (e.g., defrost, face and feet, just feet, etc.); Adjust seat heat/ventilation; and the like.

Similarly, a second force threshold can be correlated with a second system, such as an audio system of a vehicle. In one embodiment, the second threshold is at a force greater than the first threshold. In another embodiment, the second threshold can be at a force less than the first threshold. Similar to the above, once the audio system is selected using force on the track pad 300, control messages can be sent to the audio system using gestures or other actions using the track pad 300 that are at least partially dependent upon the position along the width and length of the track pad 300. For the audio system such messages can be, for example: Turn on/off; Adjust sound level; Adjust fade, balance, bass, treble, etc.; Adjust mode (e.g., radio, satellite radio, CD, auxiliary, etc.); and the like. Other systems, such as those shown in FIG. 7, can be selected and controlled in similar fashion.

The track pad system 300 disclosed herein may be particularly applicable to distracted environments, such as in automobile operation, wherein the human needs additional feedback to properly operate a machine. For example, the driver of an automobile is usually best visually focused on his or her surroundings during the driving task. The ability of the track pad system 300 to provide haptic and audible feedback makes for more sure and satisfying operation of various automobile systems. As described herein, the track pad system 300 may be used, for example, to operate stereo and/or climate controls. Each change of a station or degree could generate haptic and audible feedback. In addition, the provision of force sensitivity—and in particular thresholds—allows multiple layers of functionality from a single button. The advantage of this implementation is that the track pad 300 can replace a large number of controls and shrink the necessary reach range (and the amount of distraction) for the driver.

Figure 8:
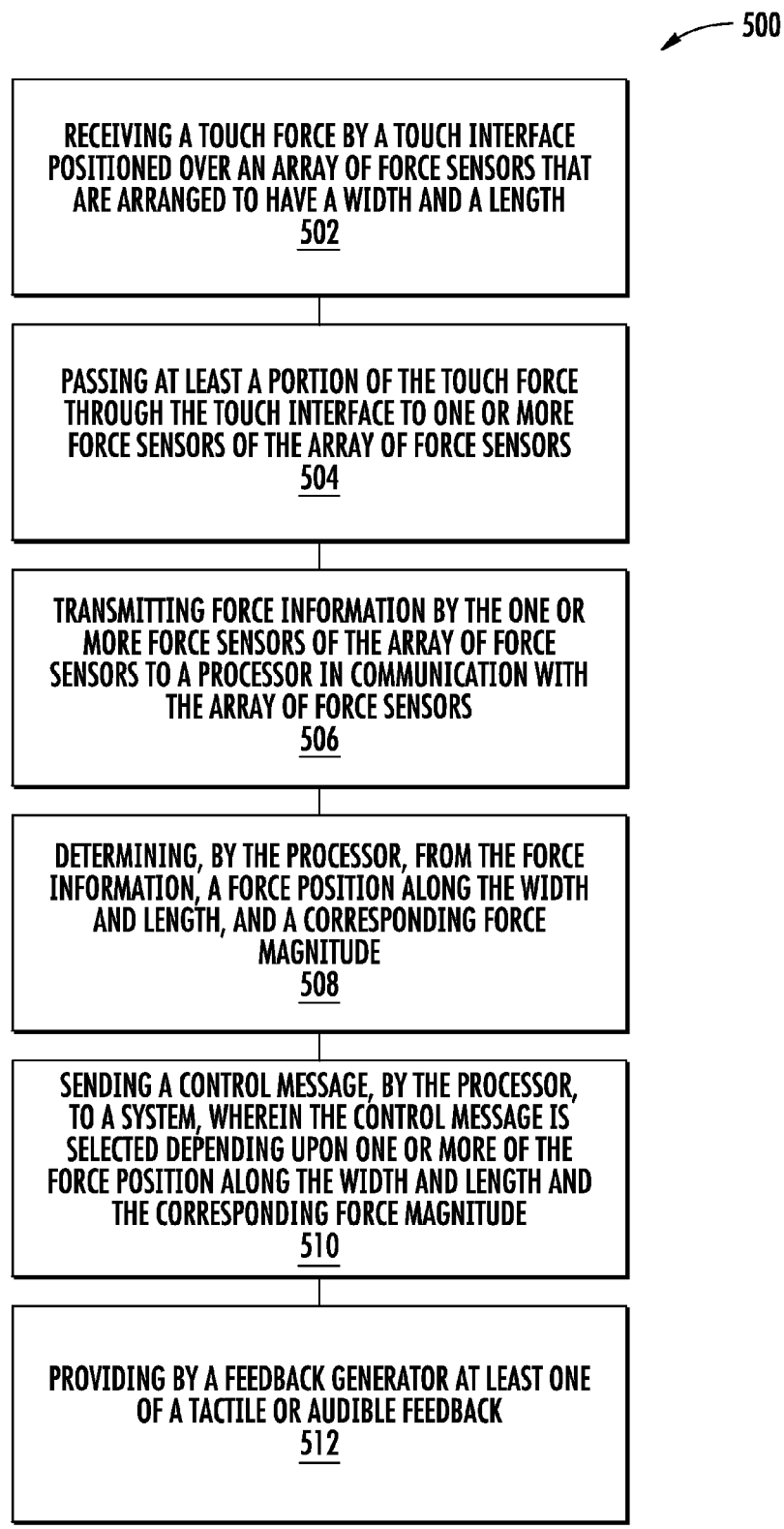
FIG. 8 is an exemplary flowchart that can be used to describe a method of controlling a system using a track pad according to one implementation.

FIG. 8 is an exemplary flowchart 500 that can be used to describe a method of controlling a system using a track pad. Steps of the method comprise Step 502, receiving a touch force by a touch interface 308 positioned over an array of force sensors 302 that are arranged to have a width 304 and a length 306. At Step 504, passing at least a portion of the touch force through the touch interface 308 to one or more force sensors 302 of the array of force sensors 302. At Step 506, transmitting force information by the one or more force sensors 302 of the array of force sensors 302, to a processor 202 in communication with the array of force sensors 302. At Step 508, determining, by the processor, from the force information, a force position along the width 304 and length 306, and a corresponding force magnitude. At Step 510, the processor sends a control message to a system, wherein the control message is selected depending upon one or more of the force position along the width 304 and length 306 and the corresponding force magnitude. In one aspect, as described herein, sending the control message to the system, wherein the control message is selected depending upon one or more of the force position along the width and length and the corresponding force magnitude, further comprises selecting the system from a plurality of systems and selecting the control message from a plurality of control messages, the selections made depending upon one or more of the force position along the width and length and the corresponding force magnitude. In one embodiment, the system is selected from the plurality of systems depending upon the force magnitude and the control message is selected from the plurality of control messages depending at least partially upon the force position along the width and length. For example, the force magnitude can have at least three thresholds and the system is selected from the plurality of systems depending upon the force magnitude exceeding one or more of the thresholds. In one aspect, a different system is selected for each threshold. In another embodiment, the control message is selected depending upon the force magnitude exceeding a threshold, wherein the force magnitude has at least three thresholds and the control message is selected depending upon the force magnitude exceeding one or more of the thresholds. In one aspect, a different control message is selected for each threshold. At Step 512, a feedback generator provides at least one of a tactile or audible feedback. In one aspect, the feedback generator provides a tactile or audible feedback that is proportional to at least one of the force position and the force magnitude. For example, the feedback may get louder, more frequent, more powerful, quieter, less powerful, etc. depending upon the force applied to the track pad 300 or at least partially upon the force position. In one embodiment, the feedback generator can be configured to provide an audible tick or other sound when the control message is selected from the plurality of control messages depending at least partially upon the force position along the width and length and provide the tactile feedback for each selection made depending on the force magnitude.

The flowchart and block diagrams in the figures illustrate the architecture, functionality, and operation of possible implementations of systems, methods and computer program products according to various implementations of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

The invention claimed is:

1. A track pad system comprising:
a two-dimensional array of force sensors arranged to have a length and a width, the two-dimensional array of force sensors being disposed on a first surface of a circuit board;
a touch interface plate at least partially comprised of a transparent or a translucent material disposed over the two-dimensional array of force sensors, the touch interface plate comprising a lower surface disposed facing the two-dimensional array of force sensors and an upper surface opposite the lower surface, wherein the touch interface plate passes touch forces incident on the upper surface through to at least two of the force sensors of the two-dimensional array of force sensors, and wherein the lower surface of the touch interface plate is spaced apart from the first surface of the circuit board;
at least one light source disposed adjacent a side edge of the touch interface plate, the side edge extending between the lower surface and the upper surface of the touch interface plate and said side edge relatively orthogonal to said first surface of the circuit board, the light source directing light toward the side edge of the touch interface plate; and
a feedback generator connected to the circuit board and coupled to the lower surface of the touch interface plate, wherein the feedback generator is aligned orthogonally to the touch interface plate in plan view and extends between the lower surface of the touch interface plate and at least the first surface of the circuit board and is disposed between and parallel to at least two of the force sensors of the two-dimensional array of the force sensors in the plan view, wherein the feedback generator generates at least one of a tactile or audible feedback that is amplified by-the touch interface plate.

2. The track pad system of claim 1, wherein the illuminated portion of the touch interface plate is transparent.

3. The track pad system of claim 1, wherein the illuminated portion of the touch interface plate is translucent.

4. The track pad system of claim 1, wherein one or more icons are disposed adjacent the illuminated portion of the touch interface plate.

5. The track pad system of claim 4, wherein the illuminated portion of the touch interface plate is translucent and the icons are not visible unless the light source is excited.

6. The track pad system of claim 4, wherein the one or more icons are disposed on an overlay that is disposed adjacent the illuminated portion of the touch interface plate.

7. The track pad system of claim 4, wherein the one or more icons are etched adjacent the illuminated portion of the touch interface plate.

8. The track pad system of claim 4, wherein the one or more icons are displayed on the touch interface plate via an active matrix display.

9. The track pad system of claim 8, wherein the active matrix display comprises a graphic screen.

10. The track pad system of claim 9, wherein the graphic screen is selected from the group consisting of: an organic light-emitting diode (OLED), a thin-film-transistor liquid crystal display (TFT LCD), a segmented liquid crystal display, and a liquid crystal display (LCD).

11. The track pad system of claim 1, further comprising one or more light altering films disposed adjacent at least one surface of the touch interface plate.

12. The track pad system of claim 1, wherein the light source is a first light emitting diode, and the system comprises a second light emitting diode.

13. The track pad system of claim 12, wherein the first light emitting diode is disposed adjacent the side edge of the touch interface plate and the second light emitting diode is disposed adjacent a second side surface of the touch interface plate.

14. The track pad system of claim 12, wherein the side edge is a first side edge, and the first light emitting diode is disposed adjacent the first side edge and the second light emitting diode is disposed adjacent a second side edge of the touch interface plate, the second side edge being spaced apart from the first side edge.

15. The track pad system of claim 1, further comprising a processor in electronic communication with the two-dimensional array of force sensors, the processor configured for:
receiving force information from one or more force sensors;

determining from the force information a force position along the width and length and a corresponding force magnitude, the force position identifying the location of the touch force on the upper surface of the touch interface plate.

16. The track pad system of claim 15, wherein the processor is configured for adjusting an intensity of the light source in response to ambient lighting conditions.

17. The track pad system of claim 15, wherein the processor is configured for adjusting an intensity of the light source in response to a certain amount of force detected by the force sensors.

18. The track pad system of claim 17, wherein the processor is configured for adjusting an intensity of the light source based on the location of force detected by the force sensors.

19. The track pad system of claim 15, wherein the processor is configured for adjusting an intensity of the light source based on the location of force detected by the force sensors.

20. The track pad system of claim 15, wherein the circuit board includes the processor and light source.

21. The track pad system of claim 1, wherein the force sensors comprise microelectromechanical (MEMS) force sensors.

22. The track pad system of claim 21, wherein the MEMS sensors are structure-based piezo-resistive sensors.

23. The track pad system of claim 1, wherein the first surface of the circuit board comprises a reflective material, the reflective material configured for directing the light from the light source through the illuminated portion of the touch interface plate.

24. The track pad system of claim 1, wherein the lower surface of the touch interface plate comprises a reflective material that faces the upper surface, the reflective material configured for directing light from the light source through the illuminated portion of the touch interface plate.

* * * * *